3,314,748
PRODUCTION OF DENSE SODA ASH
Carlton J. Howard, Salina, Peter Sopchak, Clay, and Eugene B. Port, Solvay, N.Y., assignors to Allied Chemical Corporation, New York, N.Y., a corporation of New York
Filed Mar. 12, 1964, Ser. No. 351,330
5 Claims. (Cl. 23—63)

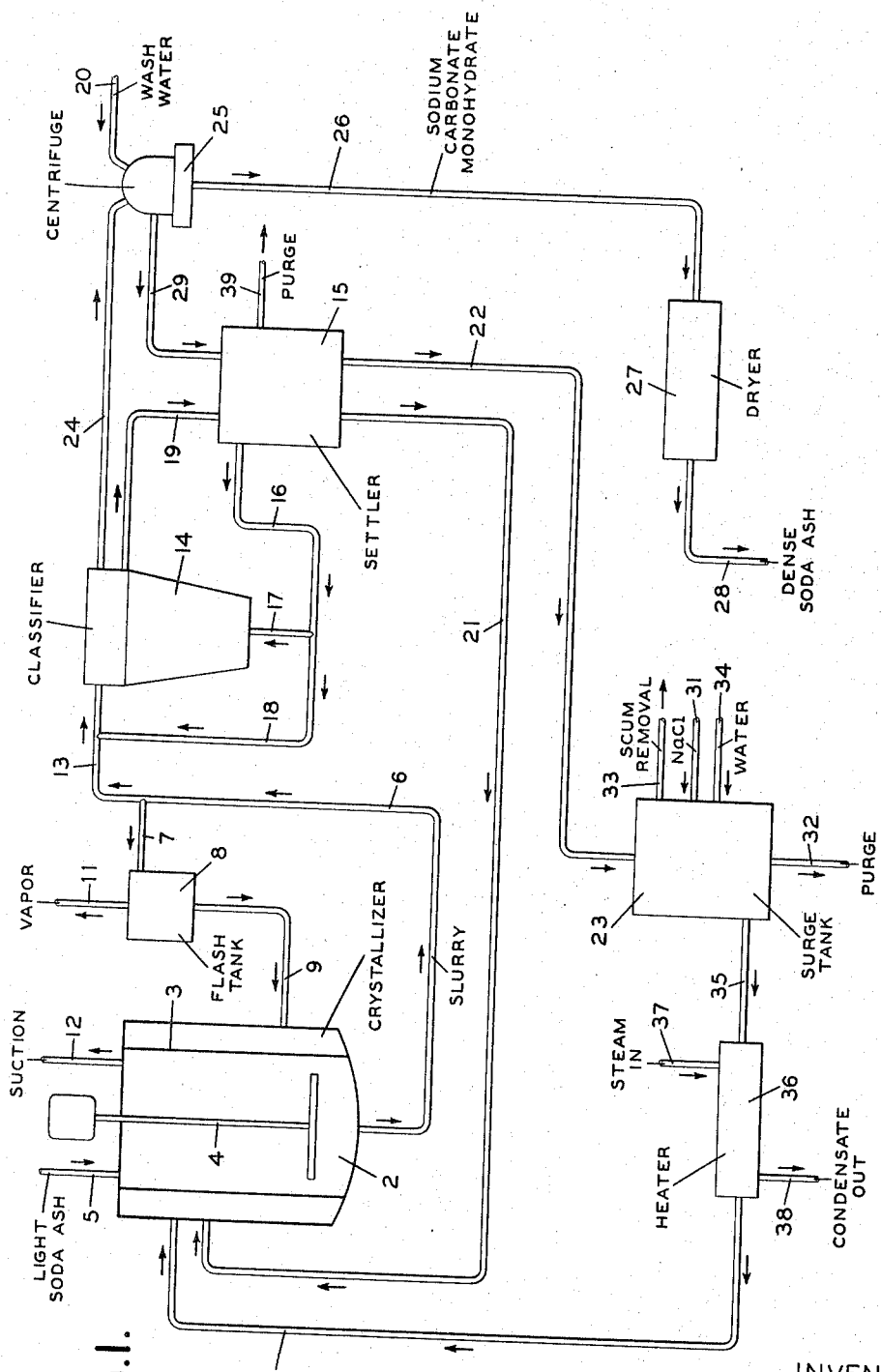

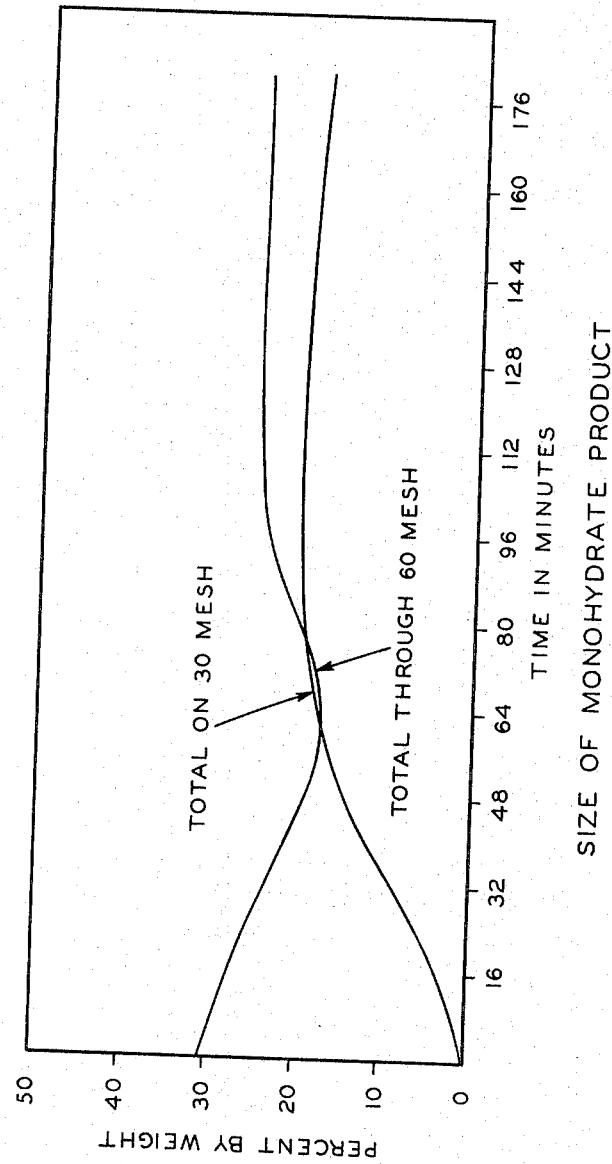

This invention relates to dense soda ash and more particularly refers to a new and improved process for the production of high purity dense soda ash of desired particle size for use in the manufacture of glass, in the desulfurization of molten metals particularly iron, and in other uses requiring soda ash in various ranges of particle size.

A major portion of dense ash is manufactured for use in the glass industry. The requirement of the glass industry for finer granulations of sand so that rapid batch melting may be achieved has brought steady pressure on soda ash manufacturers to produce finer granulations of dense ash which still retain desirable free-flowing and non-dusting properties. The more closely the soda matches the fine sands used, the less segregation occurs and the faster the melting rate. Segregation of the mixed materials before or during the melting is detrimental to this effort. Free-flowing quality is also required to facilitate handling in unloading, transference to and from storage and passage through automatic weighing facilities. There must be little or no dust during handling to avoid irritation to workers and during addition to the melting furnace to avoid transfer of sodium carbonate to the furnace checker work which causes a decrease in furnace life. Although many glass manufacturers desire the finer granulations of soda ash, there are some who still prefer the coarser granulations which have desirable free-flowing and dust-free characteristics.

There are other consumers of dense soda ash who prefer the coarser granulations. Examples of these are foundries that use coarse dense ash for the desulfurization of molten iron and compounders who use coarse dense ash in the preparation of industrial cleaners of various types. In the desulfurization of molten iron, solid particles of dense ash are introduced beneath the surface of the liquid. Any dusty and very fine particles of ash are undesirable since they are carried upward and out of the pot by the rapidly rising stream of hot gases and represent loss of reagent.

It is thus apparent that the manufacturers of dense soda ash must be able to supply clean, free-flowing, and dustless dense soda ash in various granulations to satisfy different customers.

Light soda ash, a readily available commercial product, is a powdery material with a low density of about 550 grams per liter, contains appreciable amounts of impurities particularly sodium chloride and is generally unsuitable for use in the glass industry or in the foundry industry. The art has prepared dense ash by mixing excess hot water with hot light ash to form a wet mix of agglomerated and single crystals of sodium carbonate monohydrate. This wet mass is then transferred to a drier in which the free water and water of crystallization are removed leaving monohydrate skeletons as dense ash. Chemically, this resulting dense ash is no better than the light ash, and since frequently various materials are added to the mixture as crystallization aids, the resulting dense ash is less pure than the starting light ash. Likewise, the physical properties of the dense ash from this drier render it unsuitable for use in the glass industry as such. It must be screened, and the oversize portion, which is sometimes as high at 25% retained on a 20 mesh screen, must be ground to reduce it to satisfactory size. The grinding operation converts much of the oversize material to undesirable dust and fines. In addition, the ground particles in the acceptable size range are fuzzy and flow very poorly. Frequently, there is too much fine material in the dryer discharge, and this excess must be removed by screening or air classification and sent back for recycle together with the dust and fines from the grinding operation. Combining the acceptable portions of the dryer discharge and the discharge from the grinding operation gives a dense ash product which while usable, leaves much to be desired with respect to flowability, lack of dustiness, chemical purity, and particle shape. Thus, production of large amounts of under and oversize particles materially increases the cost of operation. In general, the product from the dryer should contain less than 5% plus 20 mesh particles and 15% or less of minus 100 mesh particles.

An object of the present invention is to provide a process for production of dense sodium carbonate crystals containing reduced amounts of under and oversize particles. Another object is to provide a method for producing dense sodium carbonate crystals of high purity in various size ranges to suit demand and which are eminently suitable for use in the manufacture of glass. A further object is to provide an efficient economical process for converting light soda ash to high quality dense soda ash. Another object is to provide a method for producing dense sodium carbonate crystals of relatively coarse size suitable for use in desulfurizing molten metals. Another object is to provide a method for producing sodium carbonate monohydrate crystals suitable for use in water softening and cleansing compounds and for photographic use. Other objects and advantages will be apparent from the following description and accompanying drawing.

FIGURE 1 shows diagrammatically the process of preparing sodium carbonate monohydrate crystals and dense soda ash.

FIGURE 2 is a graph which shows particle size distribution in the monohydrate product slurry versus time.

Consideration of what constitutes high quality dense soda ash involves chemical composition, granular size distribution, bulk density and particle geometry. Obviously, the higher the assay ($Na_2CO_3$) the better the quality of the product. A distinct improvement in assay was obtained since average $Na_2CO_3$ content of analyzed pilot plant product produced in accordance with the present invention was 99.85% as compared to 99.72% for light ash and 99.62% for current conventional dense ash. Of particular importance in the quality of the product is the salt (NaCl) content. Conventional dense ash and the light soda ash from which it is derived typically contains about 0.25 to 0.35% NaCl. The product of the process of the present invention typically contains 0.04% or less sodium chloride. Sodium sulfate is also a normal impurity in soda ash and typically occurs in conventional dense soda ash and light soda ash in an amount of 0.01%. The product of the process contains less than 0.004% sodium sulfate. Similarly, the amount of magnesium carbonate impurities in the present product is about ½ of that which is typically present in conventional dense soda ash and light soda ash.

Granulation of the dense ash product for use in glass manufacture should desirably approximate that of the sand used, i.e. the range of particle size and the amount of each should reasonably approximate that of the sand. As illustrative, the tabulation below shows the granulation of different sands used in the manufacture of glass.

GRANULATION

| U.S. Sieve No. | Japanese Source | Penn Source | Manley Source | Oklahoma Source |
|---|---|---|---|---|
| Percent +20 | 0.3 | 0.0 | 0.0 | 0 |
| Percent −20 +40 | 31.6 | 14.3 | 3.2 | 0.1 |
| Percent −40 +60 | 36.3 | 60.1 | 55.5 | 1.9 |
| Percent −60 +80 | 12.5 | 16.4 | 30.4 | 15.5 |
| Percent −80 +100 | 6.2 | 4.4 | 5.8 | 27.7 |
| Percent −100 +140 | 7.9 | 3.5 | 0.2 | 42.3 |
| Percent −140 +200 | *5.2 | 1.1 | 4.8 | 11.5 |
| Percent −200 | | 0.2 | 0.1 | 1.0 |

* Includes material passing through a 200 mesh screen.
NOTE.—Designation of minus means material passing through mesh size screen. Designation of plus means material caught on mesh size screen.

From this table, it is readily apparent that different granulations of dense soda ash would be desirable when using the different sands. However, any substantial amounts of particles greater than 20 mesh and smaller than about 100 to 200 mesh are undesirable.

Bulk density of about 60–70 pounds per cubic foot, i.e. about 950 to 1100 grams per liter, is considered excellent for use in glass manufacture. Bulk density should not be considered by itself but also in relation to the shape and average size particle which have a significant bearing on final density. Agglomeration, occurring either during crystallization or drying, adversely affects density. Finer granulations tend to increase the density. Material with rounded corners tends to higher bulk densities. The quality of dense soda ash is also determined by its particle geometry, i.e. appearance and shape. The dense soda ash crystallization product in accordance with the present invention, is composed of dehydrated monohydrate crystal skeletons. Externally, preferred crystals resembled rectangular prisms with edges intact. Pilot plant material produced by the present process normally had a ratio of dimensions of height to width to length of 1:1:2–3, although it is possible if desired to increase the length. Segregation of pilot plant soda with the 1:1:2–3 dimensions when mixed with sand was shown to be at a minimum and essentially comparable to cubic ash.

We have found a method by means of which we can control particle size of sodium carbonate monohydrate crystals with substantial elimination of agglomerates and lumps, and a greater yield of acceptable product, i.e. a product that contained 15% or less of −100 mesh (U.S. sieve size) and less than 5% plus 20 mesh with yields of over 95% of marketable material.

In accordance with the present invention, high quality dense soda ash eminently suitable for use by the glass industry and by others requiring dense soda ash of various granulations may be efficiently and economically prepared from light soda ash by a process involving admixing light soda ash in a crystallizing zone with an aqueous slurry containing (a) a mother liquor having dissolved therein 3 to 17%, preferably 10 to 16%, by weight of sodium chloride and sufficient sodium carbonate to be saturated therewith, and (b) 30 to 65% preferably 40–55%, of solid sodium carbonate monohydrate crystals based on the entire weight of the slurry, maintaining the aqueous slurry during mixing with the light ash at a temperature below the transition temperature for conversion of sodium carbonate monohydrate to sodium carbonate but at a temperature not more than 20° C. and preferably between 3 and 15° C. below the transition temperature, maintaining the solid sodium carbonate monohydrate dispersed throughout the slurry to give at least 30% monohydrate in any given part of the slurry volume, feeding light soda ash to the crystallizing zone at a rate of 50 to 300, preferably 80 to 200 pounds per hour per cubic foot of slurry volume, discharging the slurry from the crystallizing zone into a wet classifier, classifying the crystals in this slurry into a second slurry containing small crystals and a third slurry containing coarse crystals, returning small crystals to the crystallizing zone in an amount equivalent to 3 to 25%, preferably 5 to 15%, of the total weight of crystals fed to the classifier, separating the crystalline sodium carbonate monohydrate from mother liquor in the third slurry containing the coarse crystals, washing the separated crystalline sodium carbonate monohydrate to remove adherent impurities, drying the separated crystalline sodium carbonate monohydrate to produce anhydrous dense soda ash, and returning mother liquor and added water or sodium carbonate solutions to the crystallizing zone for admixture with additional light soda ash.

When dry sodium carbonate monohydrate crystals are desired, for example, as a convenient product for household water softening or as a component of detergent mixtures, the separated wet monohydrate may be dried at relatively low temperatures, for example 50 to 70° C., such that only free water is evaporated and essentially no water of hydration is removed.

It is also possible to feed a suspension of anhydrous sodium carbonate in a mother liquor containing sodium carbonate and sodium chloride as described above to the crystalizer such suspension being above, at, or slightly below the transition temperature of sodium carbonate monohydrate to sodium carbonate. This suspension can be prepared in a number of ways, for example, by (a) admixing light soda ash with mother liquor at these temperatures, (b) evaporating sodium carbonate or sodium carbonate-sodium chloride solutions at temperatures above the transition temperature, or (c) by decomposition of sodium bicarbonate suspended in an aqueous solution containing sodium carbonate, sodium bicarbonate and sodium chloride.

The accompanying drawing diagrammatically illustrates the present invention.

Referring to the drawing in FIGURE 1, aqueous solution containing dissolved sodium chloride and sodium carbonate is introduced through line 1 into crystallizer 2 which as illustrated may be a cylindrical vessel equipped with vertical baffles 3 along the sides and having a dished bottom. Agitation is provided by a stirring shaft 4 having an agitator such as a turbine type. An aqueous slurry is maintained in the crystallizer. The mother liquor of this slurry contains 3 to 17%, preferably 10 to 16%, by weight NaCl, and it is saturated with respect to $Na_2CO_3$. The solids in suspension amount to 30 to 65%, preferably 40 to 55%, of solid sodium carbonate monohydrate based on the entire weight of the slurry.

Good dispersion of solids throughout the entire body of slurry is important and to obtain this condition the agitator is disposed in a position and rotated at a speed such that in each and every part of the crystallizer slurry there is at least 30% of suspended monohydrate crystals. To determine whether the conditions are proper to effect the desired result, samples are taken from various points within the crystallizer and analyzed for percent suspended solids. If any samples show less than 30% solids, the agitation is modified such that it will increase the solids to at least 30% in all parts of the crystallizer slurry. If good agitation is not maintained, agglomerates and star clusters result. There are several types of agitators which may be used such as paddle, turbine, and propeller. For example, in pilot plant tests a turbine type was used having two sets of turbine blades on a single shaft. Increased speed of agitation beyond that required to maintain at least a 30% suspension of monohydrate crystals in any given part of the slurry volume can be used, if desired, to decrease the average monohydrate crystal size in the product leaving the crystallizer. A paddle type agitator can be used to give larger average monohydrate crystal size than that obtainable from turbine or propeller agitators.

Sodium chloride in excess of about 17% in the mother liquor tends to crystallize out and should be avoided. Monohydrate crystals appear to be somewhat harder when grown in the solutions with increasing amounts of sodium chloride present, and a concentration of 10–16% NaCl is preferred. Concentrations less than 3% NaCl require large amounts of purge to keep the NaCl level this low, and increased loss of $Na_2CO_3$ from the system results since greater than 9 parts of $Na_2CO_3$ are purged with each part of NaCl.

It was found that unusually high solids suspensions permitted high light ash feed rates with formation of good crystals having dimension ratios of about 1:1:2.5 and a minimum of agglomerates or star-clusters. At suspended solids concentrations of greater than 65%, the slurry became too thick to agitate efficiently and crystal quality deteriorated. At less than about 30% suspended solids, soda ash feed rates had to be reduced to less than about 80 pounds per hour per cubic foot of slurry volume to avoid formation of excessive amounts of agglomerates and star-clusters. The aqueous solution entering via line 1 containing dissolved sodium chloride and sodium carbonate is normally at or near saturation with respect to sodium carbonate. Light soda ash is introduced through line 5 into the crystallizer and falls on the surface of the slurry and the particles of solid are quickly wetted and dispersed throughout the slurry.

Temperatures within the crystallizer are important and should not be more than 20° C. below the $$Na_2CO_3 \cdot H_2O \rightleftharpoons Na_2CO_3 + H_2O$$

transition temperature for the mother liquor. For fine granulations, the temperature can be nearer 20° C. below the transition temperature, and for coarse granulations the temperature should be nearer 3° C. below the transition temperature. At temperatures less than 3° C. below the transition temperature, the conversion rate is slower and greater retention times are required in the crystallizer, thus reducing its capacity. Particularly good results are obtained at temperatures between 3 and 15° C. below the transition temperature. With a 3% sodium chloride concentration, the transition temperature is about 107.5° C., and this transition temperature drops proportionately so that with a concentration of about 17% sodium chloride, the transition temperature is about 102° C.

Temperature control in the crystallizer may be done in a variety of ways, as for example, by controlling the temperature of entering materials, by circulating through a water-cooled heat-exchanger or by blowing air across the surface of the slurry. We have found a particularly advantageous way of obtaining good control in crystallizer 2 by circulating slurry through flash tank 8 maintained at a pressure below crystallizer 2, via lines 6 and 7 and returning it through line 9. Enough water vapor is removed by vacuum maintained in line 11 to cool the slurry sufficiently so that when it is sent back to the crystallizer it will cool the main body of the slurry to the desired temperature. Water vapor diffusion into soda ash feed line 5 oftentimes caused plugging of feed line 5. We found that suction maintained on crystallizer 2 via line 12 prevented water vapor diffusion into the soda ash feed line and reduced plugging of the feed line. A small spray of water may be used if necessary in suction line 12 to eliminate plugging of the line due to some of the light ash dust being carried into it. The temperature of the light soda ash entering through line 5 is not critical and may vary from as low as about 30° C. to as high as about 180° C. From a practical point of view, this is important because it permits use of light soda ash from various sources such as bulk storages at different temperatures.

The feed rate of light ash to the crystallizer may be 50 to 300 pounds per hour per cubic foot of slurry. However, above about 300 lb./hr./ft.$^3$, the quality of the crystals in the discharge of the crystallizer deteriorates with the formation of more agglomerates as well as an excessive amount of fines, and it becomes necessary to remove the excessive amount of fines from the system, thus increasing the cost of the product. Feed rates below about 50 lb./hr./ft.$^3$ tend to give too fine a product. Particularly good results are obtained at rates between about 80 and 200 lb./hr./ft.$^3$ These rates are much higher than the rates normally obtained on evaporative crystallization which are of the order of 10 to 15 pounds per hour per cubic foot of liquor volume.

The slurry with suspended sodium carbonate monohydrate leaving crystallizer 2 via line 6 is divided into two streams, one of which is returned to the crystallizer after cooling in the flash tank and the other which goes forward in the process via line 13 to the classifier 14. Here the slurry is separated into a coarse slurry and a fines slurry. The classifier is desirably of a type which permits recycle of clear mother liquor to provide sufficient elutriation to remove fines to the extent required. Elutriation liquor is pumped from the top of settler 15 via lines 16 and 17 to classifier 14. Feed slurry is diluted with clear mother liquor via line 18. The fines slurry leaves the classifier via line 19 and is transferred to settler 15 in which the fine solid particles settle toward the bottom and clear mother liquor can be drawn off the top through line 16 as elutriation liquor for the classifier 14. The slurry which accumulates in the lower portion of the settler 15 is withdrawn through lines 21 and 22. The stream in line 21 is returned to the crystallizer to provide additional nuclei for continued growth and to reduce the quantity of spontaneous nuclei formed therein. This stream contains fine particles of sodium carbonate monohydrate which may vary from about minus 60 mesh when coarser products are being made to about minus 100 mesh when finer products are being made. The amount of fines returned to the crystallizer may vary between about 3 to 25%, preferably 5 to 15%, of the weight of the crystals fed to the classifier depending upon the granulation desired. If less than about 3% is returned, the crystal size distribution in the crystallizer may cycle widely with time resulting in a non-uniform drier discharge. The balance of the slurry in the lower part of the settler which cannot be used in the crystallizer because it would make the product finer than desired, is sent via line 22 to surge tank 23.

The separation of sodium carbonate monohydrate crystals from mother liquor flowing through line 24 is accomplished in a conventional centrifuge 25 such as a Baker Perkins ter Meer Centrifugal. Provision is made to wash the crystals by means of wash water entering through line 20, preferably hot wash water at a temperature of 60–90° C. The quantity of wash water required is quite small usually about 0.1 to 0.2 pound of water per pound of cake and gives crystals containing less than 0.05% NaCl.

The washed centrifuged sodium carbonate monohydrate crystals containing less than 5% free water are discharged through line 26 into dryer 27 which may be any steam tube dryer of conventional design. Optimum conditions of operating the steam tube dryer are such as to give a discharge temperature less than 180° C. but more than 150° C., an exit gas dry bulb temperature of >98° C., an exit gas wet bulb temperature of <80° C., a peripheral dryer speed >75 ft./min., a retention time >22 min., a feed free moisture content of <3%, and a feed temperature of >60° C. The product dense anhydrous soda ash is discharged from the dryer through line 28.

Mother liquor separated in the centrifuge is returned via line 29 to settler 15 into which is also introduced fines slurry liquor from classifier 14 entering through line 19. Sodium chloride or preferably brine is introduced into the system through line 31. Normally, sodium chloride is introduced in the desired amount only at the start of the operation. In the course of the operation, particularly if the light ash contains a substantial amount of sodium chloride, the concentration of sodium chloride in the mother liquor may build up to too high a value and the desired concentration may be maintained by purging a small amount of relatively clear solution from the settler via line 39. Any solids or impurities settling in the bottom of surge tank 23 may also be discharged through line 32. Floating insolubles such as oils and scums may also be decanted from the surface of this surge tank through line 33. Make-up water is introduced through line 34 and serves to dissolve some or all of the excess solid sodium carbonate monohydrate which comes to the surge tank in mother liquor through line 22. The make-up water also compensates for water removed from the system. The combined stream of mother liquor and make-up water may be filtered, not shown in the drawing, to remove any solids which might be contained in the liquor. An adsorbent may be used prior to the filter to reduce organic matter. The combined streams of water and mother liquor then pass through line 35 into heater 36 which may be a simple heat exchanger wherein the liquor stream is heated by indirect contact with steam at 10–30 p.s.i.g., entering through line 37 and discharging through line 38. If the light ash feed to the crystallizer is hot, this heater will not be necessary. The preheated liquor then flows through line 1 into crystallizer 2.

The following examples illustrate the present invention.

Example I

In a pilot plant similar to that illustrated in FIGURE 1, a combined feed of aqueous liquor containing 12% NaCl and 19% $Na_2CO_3$ was continuously fed at a rate of 277 pounds per minute to a 900 gallon crystallizer. About 18 pounds per minute of sodium carbonate monohydrate was also fed suspended in this liquor as fine crystals. Commercial light soda ash containing about 0.3% NaCl was introduced into the top of the crystallizer at a rate of 186 pounds per minute. The amount of sodium carbonate monohydrate crystals in suspension in the crystallizer slurry was about 55% by weight. The temperature of the slurry was maintained at 100° C. which is 3° C. below the transition temperature. Vigorous agitation was provided by two high shear flat-blade turbine agitators on a single shaft, the agitation being sufficient to maintain the monohydrate crystals in turbulent suspension throughout the crystallizer including especially the region at and below the liquor surface.

Slurry having the following composition by weight was transferred to the classifier:

55% suspended solid $Na_2CO_3 \cdot H_2O$, and
45% mother liquor containing 15% $Na_2CO_3$ and 16% NaCl.

In the classifier, mother liquor from a settler was used as an aid to classification in such amount that the suspended solids content was reduced to 25 weight percent in the mixed feed to the classifier. From the classifier there was discharged a product slurry containing 60 weight percent suspended solid $Na_2CO_3 \cdot H_2O$ and 40 weight percent mother liquor which was sent to a centrifuge. In the centrifuge mother liquor was separated from the crystals of $Na_2CO_3 \cdot H_2O$, and the crystals were washed with hot water containing 1.4% sodium carbonate, at 70° C. introduced at the rate of 21 pounds per minute. The mother liquor and wash water were combined and returned to the settler. The fine crystals from the classifier suspended in mother liquor were discharged as a 5 weight percent slurry at the rate of 33 pounds per minute of solids in about 629 pounds per minute of mother liquor. This relatively thin fines slurry was sent to the settler in which it was thickened. Eighteen pounds per minute of these fines suspended in 180 pounds per minute of mother liquor were returned to the crystallizer. The balance of the fines was sent to a surge tank with mother liquor where it was dissolved in 30 pounds per minute of make-up water. About 97 pounds per minute of surge tank liquor containing 23% $Na_2CO_3$ and 8% NaCl was returned to the crystallizer.

A purge stream was taken from the settler containing 0.7 pound of $Na_2CO_3$, 0.6 pound of NaCl and 2.9 pounds of water per minute.

The crystals from the centrifuge containing about 3% free water were then dried in a steam tube dryer which produced at the rate of about 185 pounds per minute particles of anhydrous soda ash in the shape of the parent monohydrate crystals containing .02% NaCl and which were of rectangular or boat shape having average dimension ratios of 1:1:2.5 and a bulk density of 1085 grams per liter. The screen analysis of this product as taken directly from the dryer was as follows:

Percent +20 mesh=0.5
Percent −20 +30 mesh=0.5
Percent −30 +40=4.5
Percent −40 +60 mesh=35.5
Percent −60 +100 mesh=44.0
Percent total −100 mesh=15.0
Percent total −200 mesh=0.3

This product is well suited, without screening and milling, to mixing with a typical glass sand of the Manley type described above. Screening to remove fines was not necessary and the very small amount of oversize (+20 mesh) which was removed represented less than 1% of the dryer discharge. Thus over 99% of the dryer discharge was directly salable without any further processing.

Example II

A laboratory apparatus was set up which consisted of the following. A two liter vessel was fitted with four one-inch wide stainless steel baffles evenly spaced around the wall. A three blade propeller agitator with the outer edges of the blades forming a two-inch diameter circle was set up so that it was in the center of the vessel ¼ inch from the bottom. A siphon line consisting of an 8 mm. tube was operated by an electric timer to draw off product slurry about every 30 seconds and was immersed to ¼ of the depth of the slurry. A thermometer near the side of the vessel was used to indicate the temperature. A plastic cover was fitted over the vessel with appropriate holes for the stirrer, thermometer, siphon tube, a funnel for addition of light ash and a tube for addition of recycle mother liquor. Heated light ash was fed continuously to the funnel via a small feed screw. Hot mother liquor was fed continuously from a mother liquor reservoir via a flow meter and an electrically heated tube.

A continuous run was started by adding 760 grams of mother liquor composed of 17% $Na_2CO_3$, 13% NaCl and 70% $H_2O$ to the vessel and heating to about 90° C. 540 grams of sodium carbonate monohydrate seed crystals, containing 18% +40 mesh, 45% −40 +60 mesh, 19% −60 +100 mesh and 18% −100 mesh material was added and the entire slurry brought up to a temperature of 100° C. with the agitator revolving at a speed of 800 r.p.m. Preheated light ash at about 120° C. was fed at the rate of 25 grams per minute and preheated mother liquor containing 17% $Na_2CO_3$ and 13% NaCl was fed at 46 grams per minute. Two grams per minute of monohydrate fines were added. The size distribution of these fines was as follows:

Percent +60 mesh=0.4
Percent −60 +80 mesh=33.4
Percent −80 +100 mesh+23.0
Percent −100 +200 mesh=36.4
Percent −200 mesh=6.8

The timer operating the siphon was adjusted to give a percent on-time so that the product was removed at a rate sufficient to hold an essentially constant level in the crystallizer.

The slurry removed by suction was collected until the equivalent of about 200 grams of monohydrate solids had accumulated. This batch of slurry was then filtered with suction on a Büchner funnel, washed with two 100 ml.

portions of denatured alcohol and spread on paper to air dry at room temperature.

A summary of particle size distribution in the product slurry versus time is shown in the table and a graph is shown in FIGURE 2.

The monohydrate product collected at 176 minutes was calcined and the screen analysis was essentially the same as that of the original monohydrate. Density of the calcined product was 1090 grams per liter. This product contained less than 5% plus 20 mesh and less than 5% minus 100 mesh. This relatively coarse grade of dense ash would be a good product to mix with the coarse Japanese sand mentioned above. The ash would contain about 40% +40 mesh and the sand about 32% +40 mesh particles. The −40 +60 mesh particles would be about 63% in both ash and sand.

A finer product size distribution could be obtained by increasing the amount of recycled monohydrate fines, decreasing the average particle size of the recycle fines, as for example, by sending them through a centrifugal pump with a close fitting impeller, and/or by increasing the speed of the propeller agitator. Still coarser products could be obtained by using a paddle type agitator with recycle monohydrate fines to decrease the cycling of product size distribution.

The above examples illustrate the manner in which this process can be economically controlled to give different sized dense soda ash products having particles with good dimension ratios and without simultaneous production of any appreciable amount of over or undersized material.

TABLE.—SCREEN SIZE OF MONOHYDRATE VS. TIME—EXAMPLE II

| Time in minutes | 8 | 32 | 56 | 80 | 104 | 120 | 136 | 152 | 168 | 176 |
|---|---|---|---|---|---|---|---|---|---|---|
| Screen Size: | | | | | | | | | | |
| Percent −14 +20 mesh | | | | | | | | | | |
| Percent −20 +30 mesh | | | 0.6 | 2.8 | 3.7 | 3.4 | 4.6 | 4.4 | 4.5 | 4.2 |
| Percent −30 +40 mesh | 0.8 | 8.5 | 16.2 | 16.5 | 16.6 | 15.0 | 14.5 | 13.4 | 14.0 | 13.5 |
| Percent −40 +60 mesh | 21.3 | 29.1 | 25.1 | 29.2 | 22.0 | 22.3 | 23.3 | 22.3 | 21.8 | 21.9 |
| Percent −60 +100 mesh | 49.0 | 38.8 | 40.9 | 31.3 | 32.7 | 34.5 | 33.4 | 34.5 | 35.4 | 36.0 |
| Percent −100 mesh | 20.8 | 19.7 | 14.3 | 15.5 | 18.9 | 19.4 | 18.7 | 19.7 | 19.7 | 19.6 |
| | 8.1 | 3.9 | 2.9 | 4.7 | 6.1 | 5.4 | 5.5 | 5.7 | 4.6 | 4.8 |

We claim:

1. A process for conversion of light soda ash to high quality solid sodium carbonate crystals which comprises admixing light soda ash in a crystallizing zone with an aqueous slurry containing (a) a mother liquor having dissolved therein 3–17% of sodium chloride and sufficient sodium carbonate to be saturated therewith and (b) 30 to 65% of solid sodium carbonate monohydrate crystals based on the entire weight of the slurry, maintaining the aqueous slurry during mixing with the light ash at a temperature below the transition temperature for conversion of sodium carbonate monohydrate to anhydrous sodium carbonate, said temperature being within the range of 20° C. below the transition temperature up to the transiiton temperature, maintaining the solid sodium carbonate monohydrate dispersed throughout the slurry to give at least 30% monohydrate in any given part of the slurry volume, feeding light soda ash to the crystallizing zone at a rate of 50 to 300 pounds per hour per cubic foot of slurry volume in the crystallizing zone, discharging the slurry from the crystallizing zone and classifying the crystals in the discharged slurry into a second slurry containing small crystals and a third slurry containing coarse crystals, returning small crystals to the crystallizing zone in an amount equivalent to 3–25% of the total weight of crystals discharged from the crystallizing zone, separating crystalline sodium carbonate monohydrate from mother liquor in the third slurry containing the coarse crystals, and returning mother liquor to the crystallizing zone.

2. A process for conversion of light soda ash to high quality solid sodium carbonate crystals which comprises admixing light soda ash in a crystallizing zone with an aqueous slurry containing (a) a mother liquor having dissolved therein 3 to 17% of sodium chloride and sufficient sodium carbonate to be saturated therewith and (b) 30 to 65% of solid sodium carbonate monohydrate crystals based on the entire weight of the slurry, maintaining the aqueous slurry during mixing with the light ash at a temperature below the transition temperature for conversion of sodium carbonate monohydrate to anhydrous sodium carbonate, said temperature being within in the range of 20° C. below the transition temperature up to the transition temperature, maintaining the solid sodium carbonate monohydrate dispersed throughout the slurry to give at least 30% monohydrate in any given part of the slurry volume, feeding light soda ash to the crystallizing zone at a rate of 50 to 300 pounds per hour per cubic foot of slurry volume in the crystallizing zone, discharging the slurry from the crystallizing zone and classifying the crystals in the discharged slurry into a second slurry containing small crystals and a third slurry containing coarse crystals, returning small crystals to the crystallizing zone in an amount equivalent to 3 to 25% of the total weight of crystals discharged from the crystallizing zone, separating crystalline sodium carbonate monohydrate from mother liquor in the third slurry containing the coarse crystals, washing the separated crystalline sodium carbonate monohydrate to remove adherent impurities, drying the separated crystalline sodium carbonate monohydrate to produce anhydrous dense soda ash and returning mother liquor and added water to the crystallizing zone for admixture with additional light soda ash.

3. A process for conversion of light soda ash to high quality solid sodium carbonate crystals which comprises admixing light soda ash in a crystallizing zone with an aqueous slurry containing (a) a mother liquor having dissolved therein 10 to 16% of sodium chloride and sufficient sodium carbonate to be saturated therewith and (b) 40 to 55% of solid sodium carbonate monohydrate crystals based on the entire weight of the slurry, maintaining the aqueous slurry during mixing with the light ash at a temperature between 3 to 15° C. below the transition temperature for conversion of sodium carbonate monohydrate to anhydrous sodium carbonate, maintaining the solid sodium carbonate monohydrate dispersed throughout the slurry to give at least 30% monohydrate in any given part of the slurry volume, feeding light soda ash to the crystallizing zone at a rate of 80 to 200 pounds per hour per cubic foot of slurry volume in the crystallizing zone, discharging the slurry from the crystallizing zone and classifying the crystals in the discharged slurry into a second slurry containing small crystals and a third slurry containing coarse crystals, returning small crystals to the crystallizing zone in an amount equivalent to 5 to 15% of the total weight of crystals discharged from the crystallizing zone, separating crystalline sodium carbonate monohydrate from mother liquor in the third slurry containing the coarse crystals, washing the separated crystalline sodium carbonate monohydrate to remove adherent impurities, drying the separated crystalline sodium carbonate monohydrate to produce anhydrous dense soda ash and returning mother liquor and added water to the crystallizing zone for admixture with additional light soda ash.

4. A process as claimed in claim 1 wherein the temperature in the crystallizing zone is controlled by withdrawing slurry from the crystallizing zone, introducing said withdrawn slurry into a reduced pressure zone maintained at a pressure below the pressure in the crystallizing zone to effect vaporization of some of the water in the slurry and cooling of the slurry in the reduced pressure zone and returning the cooled slurry from the reduced pressure zone to the crystallizing zone to cool and maintain the temperature of the main body of slurry in the crystallizing zone.

5. A process as claimed in claim 1 wherein light soda ash feed is introduced through an opening into the top of the crystallizing zone above the surface of the slurry and discharged onto the surface of the slurry in the crystallizing zone, the improvement of maintaining suction in the top of the crystallizer to prevent water diffusion into the light soda ash feed opening to minimize plugging of the light soda ash feed opening.

References Cited by the Examiner

UNITED STATES PATENTS

| | | | |
|---|---|---|---|
| 1,650,244 | 11/1927 | Sundstrom et al. | 23—63 |
| 3,061,409 | 10/1962 | Robson et al. | 23—63 |
| 3,236,590 | 2/1966 | Sopchak et al. | 23—63 |

OSCAR R. VERTIZ, *Primary Examiner.*

G. T. OZAKI, *Assistant Examiner.*